(12) United States Patent
Lu et al.

(10) Patent No.: US 7,561,726 B2
(45) Date of Patent: Jul. 14, 2009

(54) AUTOMATED LANDMARK EXTRACTION FROM THREE-DIMENSIONAL WHOLE BODY SCANNED DATA

(75) Inventors: Jun-Ming Lu, Hsinchu (TW); Mao-Jiun Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 728 days.

(21) Appl. No.: 11/197,064

(22) Filed: Aug. 5, 2005

(65) Prior Publication Data
US 2006/0171590 A1  Aug. 3, 2006

(30) Foreign Application Priority Data
Dec. 9, 2004  (TW) .............................. 93138092 A

(51) Int. Cl.
*G06K 9/00* (2006.01)
*G06K 9/46* (2006.01)

(52) U.S. Cl. ...................... 382/128; 382/190

(58) Field of Classification Search ......... 382/128–134, 382/198, 111, 154, 254, 204, 311; 378/205; 600/429, 476, 426, 425, 474; 128/654; 354/419–420, 354/424; 345/473, 629, 639, 640, 641
See application file for complete search history.

(56) References Cited

U.S. PATENT DOCUMENTS

| | | | | |
|---|---|---|---|---|
| 5,782,762 | A * | 7/1998 | Vining | 600/407 |
| 5,951,475 | A * | 9/1999 | Gueziec et al. | 600/425 |
| 6,064,391 | A * | 5/2000 | Sano et al. | 345/424 |
| 6,081,739 | A * | 6/2000 | Lemchen | 600/407 |
| 6,169,817 | B1 * | 1/2001 | Parker et al. | 382/131 |
| 6,301,370 | B1 * | 10/2001 | Steffens et al. | 382/103 |
| 6,368,285 | B1 * | 4/2002 | Osadchy et al. | 600/508 |
| 6,529,617 | B1 * | 3/2003 | Prokoski | 382/128 |
| 7,184,047 | B1 * | 2/2007 | Crampton | 345/473 |
| 7,194,117 | B2 * | 3/2007 | Kaufman et al. | 382/128 |
| 7,274,810 | B2 * | 9/2007 | Reeves et al. | 382/128 |
| 7,356,178 | B2 * | 4/2008 | Ziel et al. | 382/154 |
| 2001/0031920 | A1 * | 10/2001 | Kaufman et al. | 600/431 |
| 2004/0013292 | A1 * | 1/2004 | Raunig | 382/128 |
| 2004/0066955 | A1 * | 4/2004 | Tamez-Pena et al. | 382/128 |
| 2005/0069185 | A1 * | 3/2005 | Barfuss et al. | 382/128 |
| 2005/0163357 | A1 * | 7/2005 | Makram-Ebeid et al. | 382/128 |
| 2005/0278156 | A1 * | 12/2005 | Fisher et al. | 703/2 |
| 2006/0013482 | A1 * | 1/2006 | Dawant et al. | 382/173 |
| 2008/0180448 | A1 * | 7/2008 | Anguelov et al. | 345/475 |

* cited by examiner

*Primary Examiner*—Samir A. Ahmed
*Assistant Examiner*—Mehdi Rashidian
(74) *Attorney, Agent, or Firm*—Egbert Law Offices PLLC

(57) ABSTRACT

A method for automated landmark extraction from three-dimensional whole body scanned data extracts feature points as landmarks from a plurality of point clouds obtained from a three-dimensional whole body scanner, without pre-making the landmarks on a human body before scanning. The system includes: (1) Silhouette analysis, which projects three-dimensional body scanned data onto a two-dimensional surface and observes the variations in curvature and depth; (2) Minimum circumference, which uses the variations of the circumference of body parts to define the locations of the landmarks and feature lines; (3) Gray-scale detection, which converts the color information of human body from RGB values into gray-scale values to locate the landmarks with greater variations in brightness; and (4) Human-body contour plot, which simulates the sense of touch to locate landmarks by finding the prominent and concave parts on the human body.

11 Claims, 8 Drawing Sheets

AUTOMATED LANDMARK EXTRACTION FROM THREE-DIMENSIONAL WHOLE BODY SCANNED DATA

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention involves a method for extracting landmarks from three-dimensional whole body scanned data automatically. It is an invention to extract feature points as landmarks from a plurality of point clouds obtained from a three-dimensional whole body scanner, without pre-making the landmarks on a human body before scanning. Based on the principles of simulating human vision and sense of touch, several algorithms for different kinds of landmarks were developed depending on each geometric characteristic. The algorithms include silhouette analysis, minimum circumference, grayscale detection, and human-body contour plots.

BACKGROUND OF THE INVENTION

Since three-dimensional whole body scanners were first introduced in the 1990's, many countries have invested lots of money and efforts in related researches and tests. In early researches, methods for landmark extraction still required human intervention. Nowadays, it is highly automated with the assistance of computer technology. In addition, in order to make this technology feasible for the industry, the needs for processing data more efficiently, accurately, and stably are also emphasized.

In the initial stage, most researches employed the method of pre-marking. Color markers are put on certain parts of the subject's body before scanning, and then the locations of these markers are identified manually on the computer screen. The CAESAR (Civilian American and European Surface Anthropometry Resource) project, in which a large-scaled three-dimensional anthropometric database of over 5,000 subjects was constructed across six countries in the Europe and the US, applied this technology to facilitate accurate measurements. However, even though this method yields higher identification rates, it is not time-efficient, especially when used in large projects or surveys. In these cases, the progress of data analysis often lags far behind that of scanning. Therefore, it requires considerable efforts after scanning. Later on, some researches developed methods for identifying pre-marked color markers by using their color information and the technology of image processing. Although these methods had indeed shorten the time for identifying color markers, it was still unable to shorten the time for manual pre-marking and to avoid human errors that is derived from this task.

In later stages, researchers attempted to develop methods for landmark extraction based on the shape of human body. These methods require no more needs for pre-marking before scanning, and in hence shorten the processing time and avoid the effects of human errors. These methods depict the human body in a geometric way, such as the technique of curve fitting and surface reconstruction, in order to make it easier and faster to find the locations of the features. Many software vendors, such as Human Solutions from Germany, Cyberware and [TC]2 from US, have developed new products for the use of three-dimensional body scanner using these methods. However, individual variations in body shapes inevitably reduce the identification rate of these methods, especially when they are applied to a subject of the race that is not originally designed for. Therefore, there are still difficulties in extracting landmarks successfully and accurately.

Hence, to develop a practical method for landmark extraction is an important issue that the industry concerned. For these purposes, this invention was developed according to experiences in related areas.

BRIEF SUMMARY OF THE INVENTION

This invention provides a method for automated landmark extraction from three-dimensional whole body scanned data without pre-marking the landmarks before scanning. By referencing the anthropometric database, it can be used specifically for the selected group of people. With the landmarks, feature lines, and dimensions extracted, this invention can be applied to the following fields:

1. Providers of Hardware and Software for Three-dimensional Scanning Technology:

The methods can be used for landmark extraction and measurement calculation from three-dimensional whole body scanned data. For users with the whole body scanner that the invention is designed for, the software developed based on this invention can be applied directly. For users with different kinds of whole body scanners, file conversions or software re-edition would meet the needs.

2. Apparel Industry:

With measurements calculated from whole body scanned data using this invention, it is easier to make customized clothes that requires higher fitness, such as business suits, Mandarin dress, swimsuits, and undergarments. When integrated with e-commerce and Internet technologies, it has the potential to develop online virtual fitting rooms to expand the marketing channels for the apparel industry. In addition, this invention can also be used to conduct body shape analysis to develop sizing systems for ready-to-wear garments, such as uniforms for the military, police, and students.

3. Product Design:

Anthropometric measurements calculated from whole body scanned data can be used as reference for product design. From tables and chairs to airplanes, they can be all designed to fit the human body. In addition, in the field of digital ergonomics, the measurements can realize the so-called "virtual product evaluation." That is to say, designers will be able to conduct evaluations without physical mock-ups.

4. Government Agencies:

Combining the three-dimensional whole body scanner and the software developed by this invention, a national anthropometric survey can be conducted. It will help not only to develop anthropometric database and sizing systems, but also to analyze the growth and health of the citizens.

DETAILED DESCRIPTION OF THE INVENTION

Figure 1:
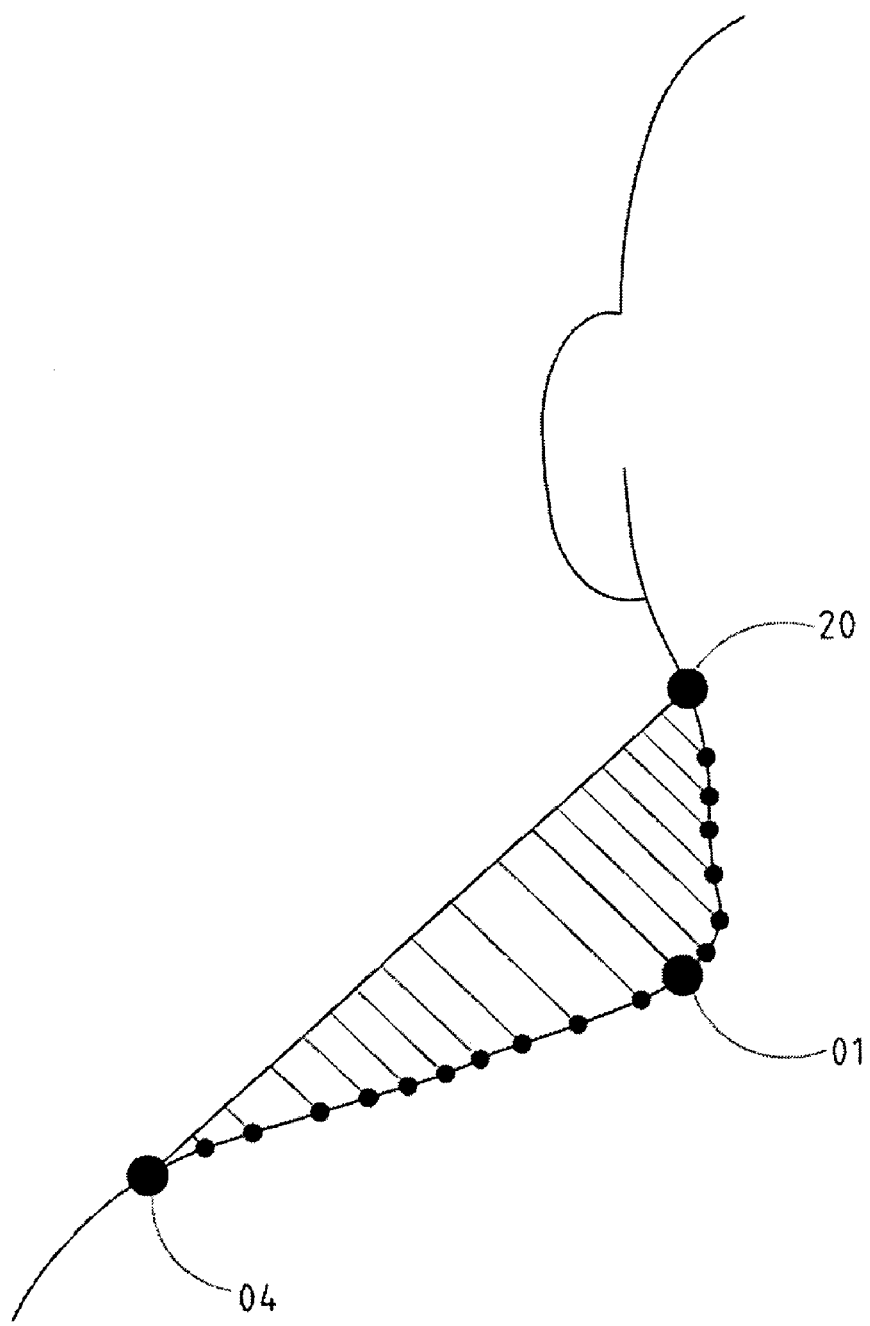
FIG. 1 is a schematic view of an example of the methods for landmark extraction of this invention.

The features and the advantages of the present invention will be more readily understood upon a thoughtful deliberation of the following detailed description of a preferred embodiment of the present invention with reference to the accompanying drawings.

First, please refer the attached diagrams, which is a better implementation example of this method for automated landmark extraction from three-dimensional whole body scanned data. It is a system, in which 14 landmarks and 3 feature lines were extracted from a plurality of data points. These landmarks include intersection of neck and shoulder 01 (side neck point), seventh cervical point 02 (back neck point), suprasternale 03 (front neck point), acromion 04, armpit 05, bust point 06, inferior angle of scapula 07, navel 08, rearmost of hip 09, crotch 10, elbow 11, wrist 12, patella 13, and lateral malleolus 14. The three feature lines include chest line L1, waist line L2, and hip line L3. Based on these landmarks and feature lines, the system calculates dozens of body dimensions (approximately 102 sets), which can be applied to product design, body shape analysis, etc.

Figure 2:
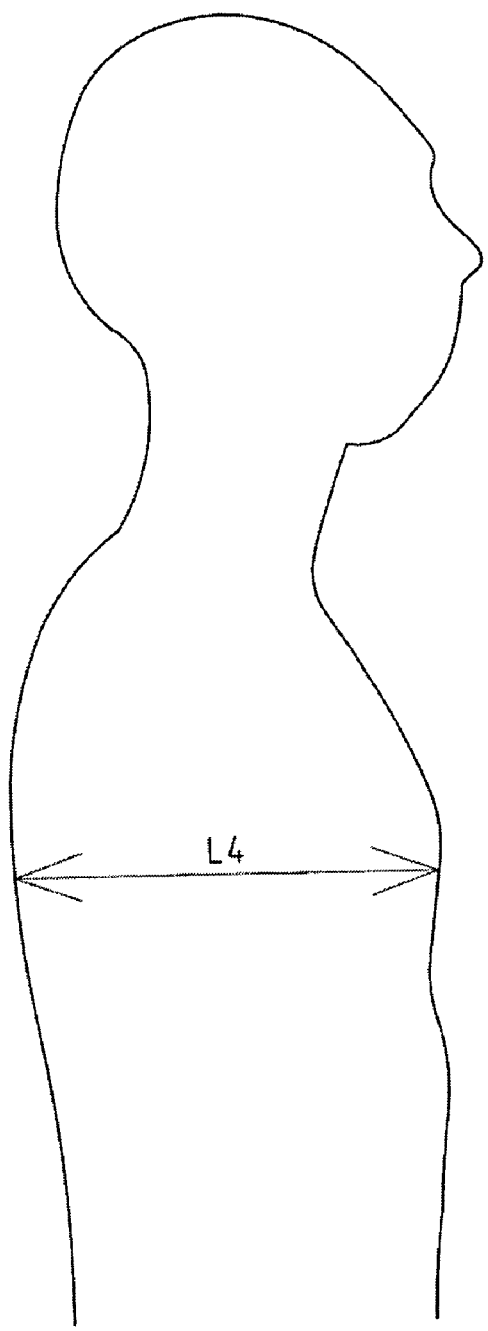
FIG. 2 is another schematic view of another example of the methods for landmark extraction of this invention.

To fit the body shapes of the Chinese people in Taiwan, this implementation example referred to the "Anthropometric Data Book of the Chinese People in Taiwan" to locate the starting point of each landmark. Based on the principles of simulating human vision and sense of touch, four kinds of algorithms were developed according to the characteristic of each landmark and feature line, including:

(I) Silhouette Analysis:

It is enabled by projecting three-dimensional body shape onto a two dimensional surface to locate the landmarks by observing the variations in curvature and depth of the silhouette. This algorithm can be applied to extract the following landmarks: armpit 05, crotch 10, intersection of neck and shoulder 01, acromion 04, chest line L1, hip line L3, and rearmost of hip 09. For example, when a set of three-dimensional body scanned data is projected onto the coronal plane, locally maximum and minimum points on the silhouette curves can be used to extract crotch point 10, intersection of neck and shoulder 01, and acromion 04. In the case of extracting the intersection of neck and shoulder (as shown in FIG. 1), all points between neck-top 20 and acromion 04 are taken into consideration. Subsequently, draw a line by connecting these two points, and then the point that has the greatest vertical distance to the line would be extracted as the intersection of neck and shoulder 01. For another example, when a set of three-dimensional body scan data is projected onto the sagittal plane, locally maximum (or minimum) point on the silhouette curve can be used to extract rearmost of hip 09. Besides, when a set of three-dimensional body scanned data is projected onto the sagittal plane, feature lines including chest line L1 and hip line L3 can be extracted by searching for the layer with the greatest depth on the silhouette curve. As shown in FIG. 2, the approximate height of the chest line from the floor is derived from the "Anthropometric Data Book of the Chinese People in Taiwan." Then the depths of each layer on the silhouette curve are compared, and the layer with the greatest depth is extracted as the chest line L4. Similarly, the hip line L3 can also be extracted by using this method.

Figure 3:
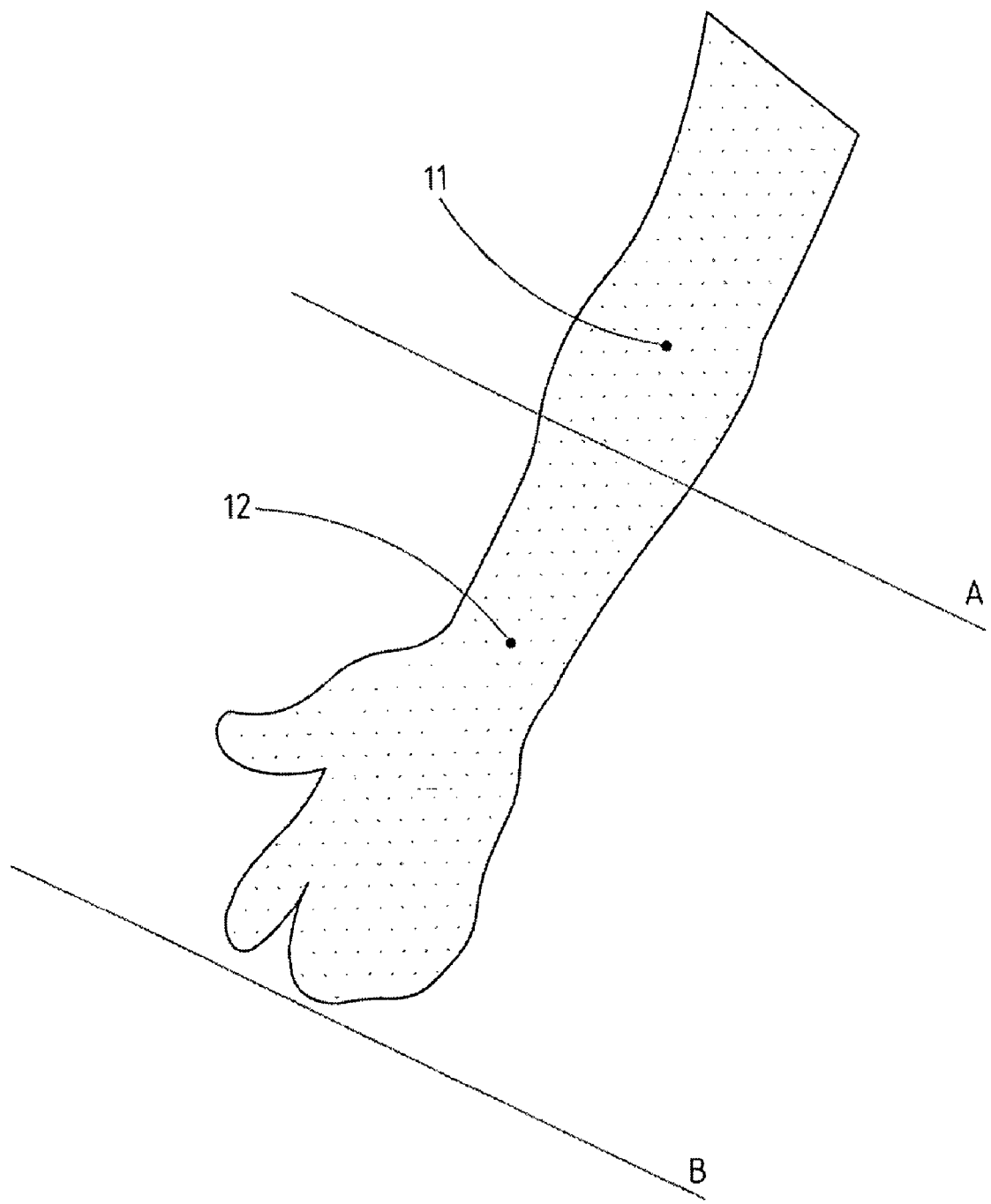
FIG. 3 is another schematic view of another example of the methods for landmark extraction of this invention.
Figure 4:
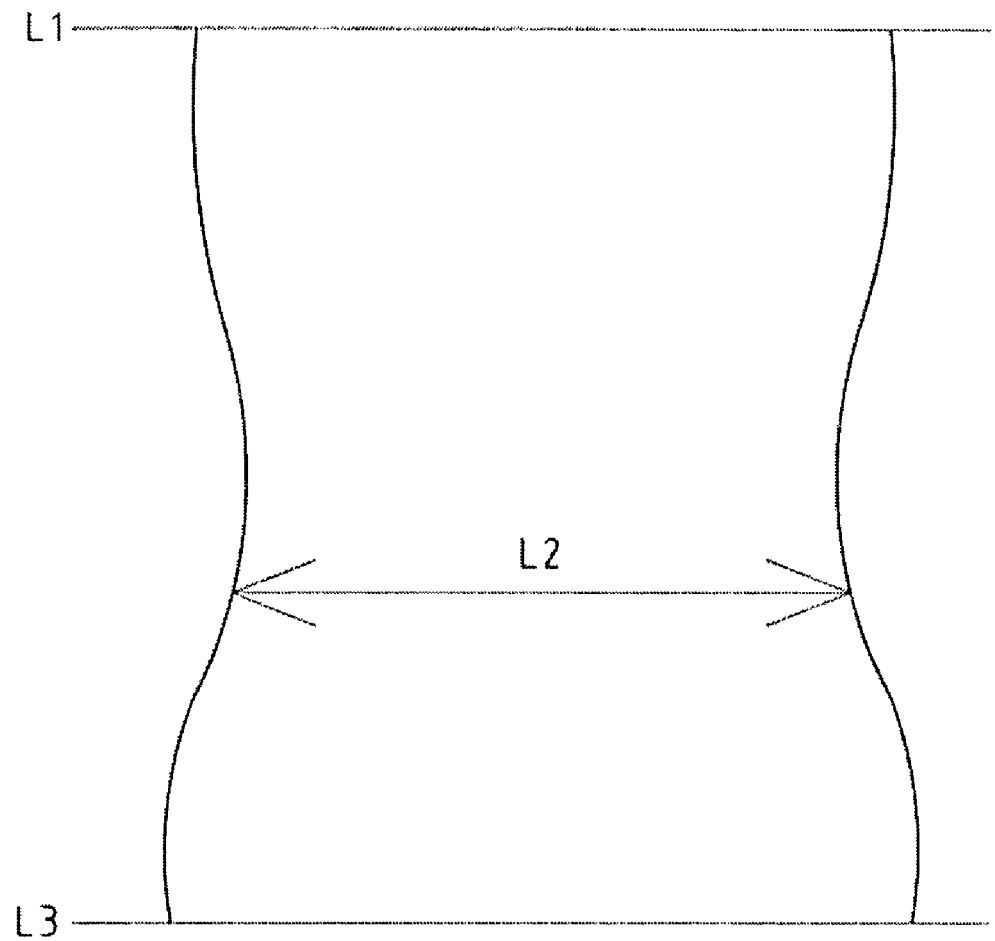
FIG. 4 is still another schematic view of still another example of the methods for landmark extraction of this invention.

(II) Minimum Circumference:

It searches the "thinnest part" of the human body to define the location of the landmark and feature line. This algorithm can be applied to extract the wrist and waist line. As shown in FIG. 3, in the range from the middle of the arm A to the finger tip B, the part with the minimum circumference is extracted as the wrist 12. Besides, as shown in FIG. 4, in the range between the chest line L1 and hip line L3, the minimum circumference detected is then extracted as waist line L2.

Figure 5:
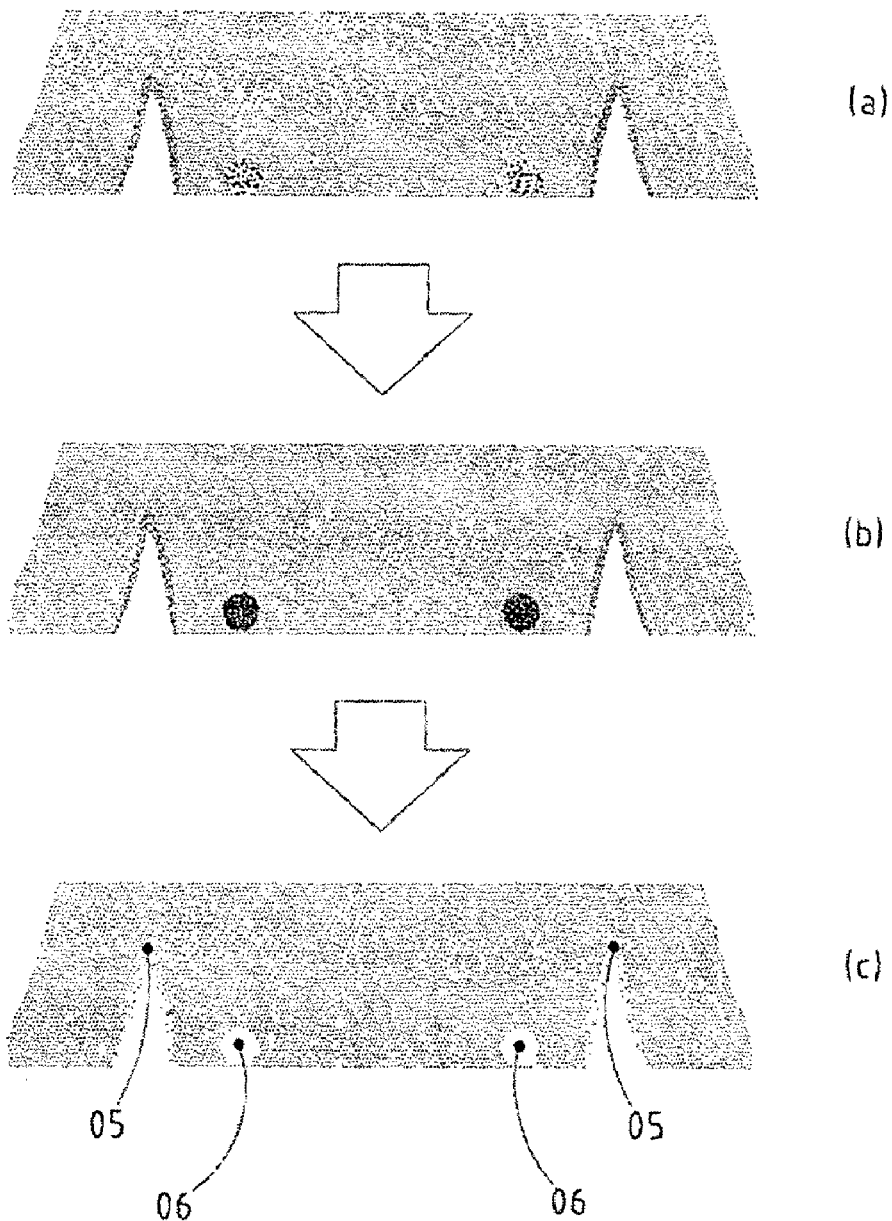
FIG. 5 is a schematic view of an example of the methods for landmark extraction of this invention.

(III) Gray-scale Detection:

It converts the color information of the human body from RGB values (FIG. 5($a$)) into gray-scale values (FIG. 5($b$)). The algorithm simulates human vision to find the parts with noticeable variations in brightness by detecting the "darker part" of the human body. It can be applied to extract bust point 06 of male subjects and armpit 05. As shown in FIG. 5($c$), the algorithm filters out the points with smaller gray-scale values. For male subjects, the center points of the two approximate circles near the height of the chest line L1 are extracted as the left and right bust points 06. The armpits 05, for both male and female subjects, are extracted by finding the highest points from the filtered data groups of the intersections of the torso and arms.

Figure 6:
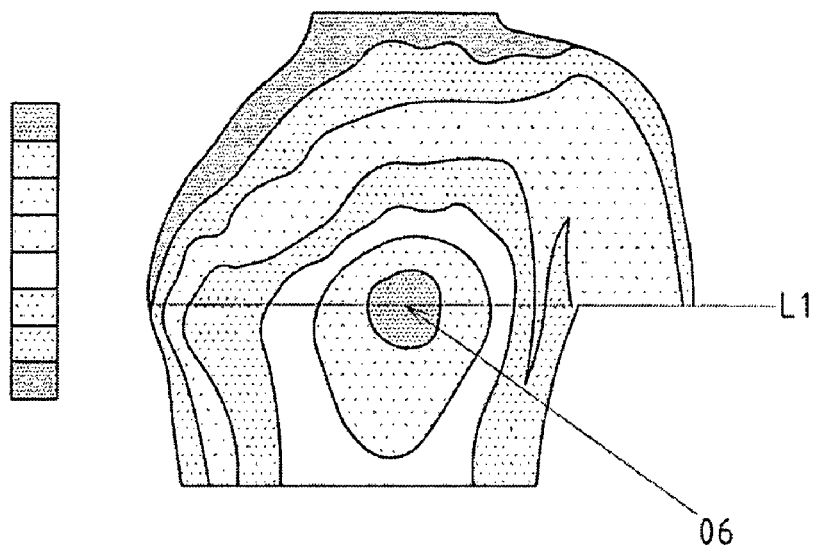
FIG. 6 is yet another schematic view of yet another example of the methods for landmark extraction of this invention.
Figure 7:
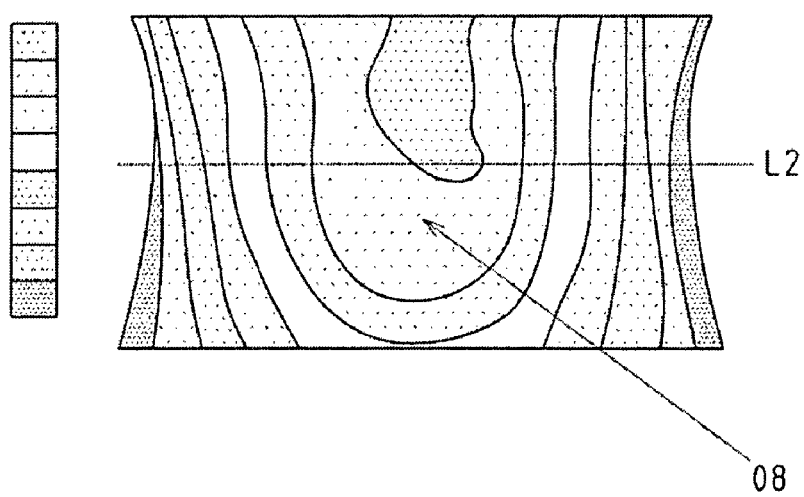
FIG. 7 is still another schematic view of still another example of the methods for landmark extraction of this invention.
Figure 8:
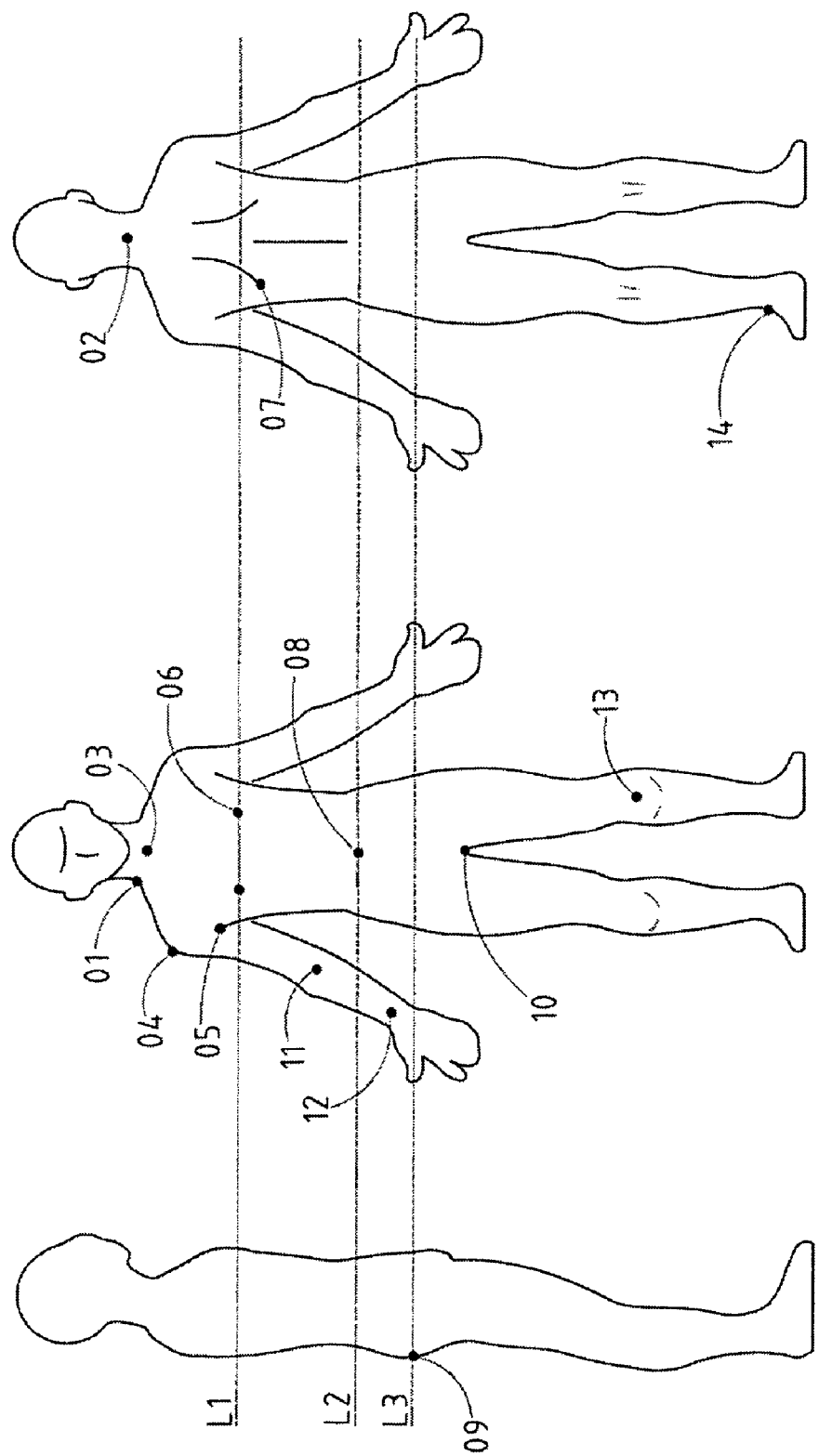
FIG. 8 is a schematic view of landmarks extracted using this invention.

(IV) Human-body Contour Plot:

It simulates the sense of touch to find the prominent/concave parts of the human body. After generating the contour plot, it locates the highest and lowest points as the landmarks of the human body. This algorithm can be applied to detect the seventh cervical point 02, bust point 06 of female subjects, inferior angle of scapula 07, patella 13 and lateral malleolus 14, elbow 11, suprasternale 03, and navel 08. For female subjects (as shown in FIG. 6), after rotating the body by 30 degrees, center points of the data group recorded with the maximum height near the height of chest line L1 are extracted as left and right bust points 06. For another example, as shown in FIG. 7, the lowest region near the center of the waist line L2 is the location of navel 08.

Figure 9:
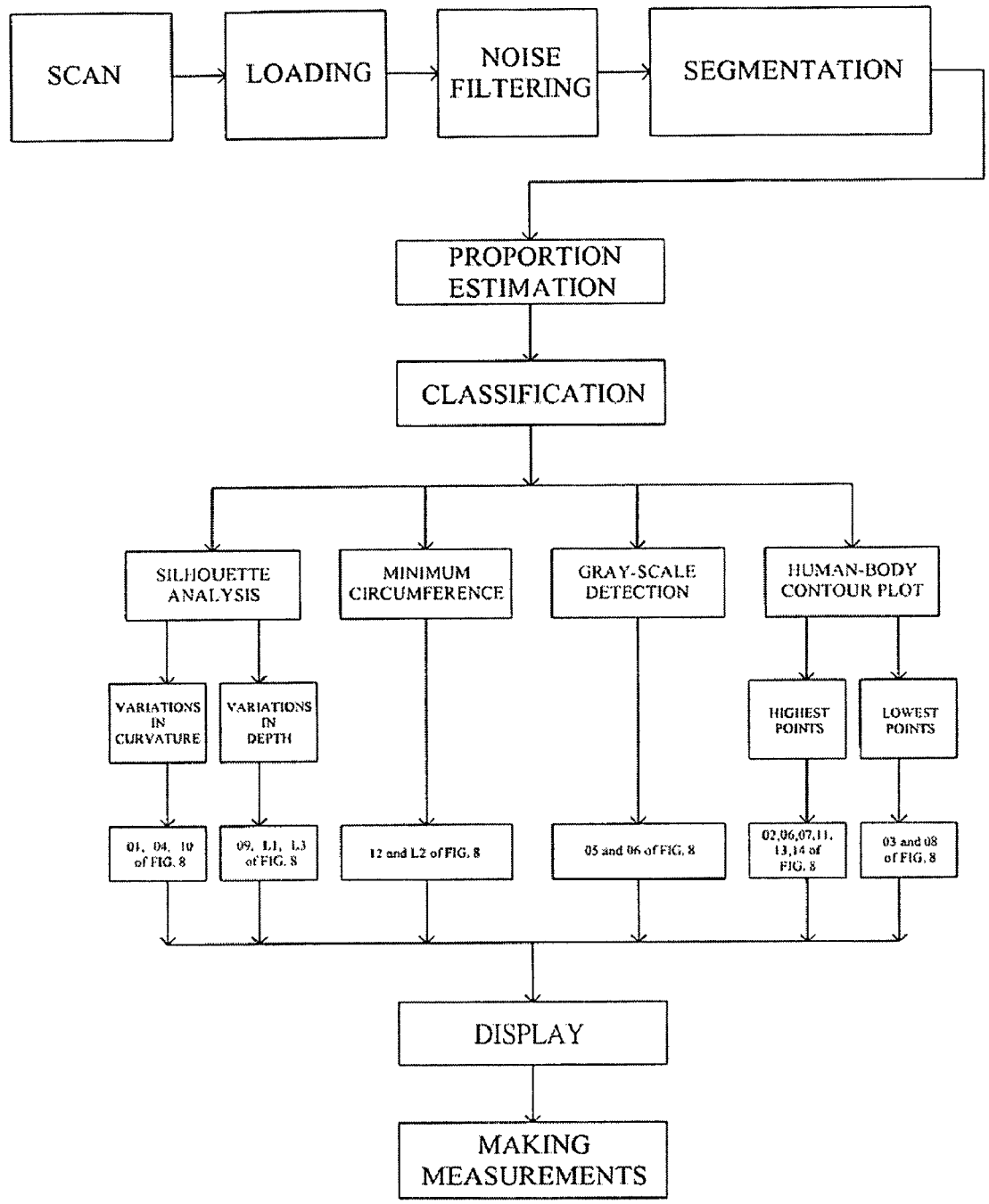
FIG. 9 is a diagrammatic illustration of a flowchart of the overall operational procedures of this invention.

The above four algorithms can be used individually or be combined with one another. For the operational procedures disclosed above, please see the flow chart in FIG. 9. Before applying the four algorithms, several procedures have to be executed first, including scanning, loading, noise filtering, body segmentation, proportion calculation, and classification of landmarks. After the landmarks and feature lines are extracted by these algorithms, the results can then be displayed on the screen and provided for numerous applications.

Additionally, this invention can be packaged into an automated landmark and measurement extraction system by using C++. Supported with the excellent computing power of computers, the results can be collected rapidly and stably.

We claim:

1. A method for automated landmark extraction from three-dimensional whole body scanned data, the method comprising:

using a computer to perform the steps of:
    extracting feature points as landmarks on the human body;
    directly extracting intersection of neck and shoulder, acromion, chest line, hip line, and rearmost of hip based on three-dimensional changes in shape of the body without premarking landmarks prior to scanning;
    utilizing silhouette analysis by projecting the three-dimensional whole body scanned data onto a coronal plane to extract an intersection of the neck and shoulder by locating locally minimum points on silhouette curves; and
    extracting the intersection of the neck and shoulder at a point between a neck top and the acromion with a maximum vertical distance to a line connected by the neck top and the acromion.

2. The method of claim 1, further comprising:
projecting the scanned data onto a coronal plane using a silhouette analysis; and
extracting the acromion by locating a locally maximum point on silhouette curves of the shoulder.

3. The method of claim 1, further comprising:
extracting a rearmost of the hip by locating a locally maximum point on silhouette curves of a hip section by using a silhouette analysis.

4. The method of claim 1, further comprising:
extracting the chest line and the hip line by locating layers with greatest depths on silhouette curves by using a silhouette analysis.

5. A method for automated landmark extraction from three-dimensional whole body scanned data, the method comprising:
    using a computer to perform the steps of:
        extracting feature points as landmarks on a human body;
        directly extracting a wrist and waist line based on three-dimensional changes in shape of the human body without premarking landmarks before scanning; and
        using a minimum circumference scanned from a thinnest part on the human body for extracting the wrist and the waist line.

6. A method for automated landmark extraction from three-dimensional whole body scanned data, the method comprising:
    using a computer to perform the steps of:
        extracting feature points as landmarks on a human body;
        directly extracting bust points based on three-dimensional changes in shape of the human body without premarking landmarks before scanning;
        converting color information of the human body from RGB values into gray-scale values; and
        locating visually darker parts to find parts with noticeable variations in brightness to extract bust points for male subjects by filtering out the points with smaller gray-scale values.

7. The method for automated landmark extraction from three-dimensional whole body scanned data of claim 6, further comprising:
    utilizing human body contour plots for extraction; and
    simulating a sense of touch by locating prominent parts in a chest section of the human body to extract bust points for female subjects.

8. A method for automated landmark extraction from three-dimensional whole body scanned data, the method comprising:
    using a computer to perform the steps of:
        extracting feature points as landmarks on a human body; and
        directly extracting an armpit based on three-dimensional changes in shape of the human body without premarking landmarks before scanning;
        projecting the three-dimensional body scanned data onto a coronal plane; and
        extracting approximate locations of armpits by locating locally maximum points on silhouette curves of the intersection of torso and arms by using silhouette analysis.

9. The method for automated landmark extraction from three-dimensional whole body scanned data of claim 8, further comprising:
    convening color information of the scanned data from RGB values into gray-scale values;
    locating visually darker parts to find parts with noticeable variations in brightness;
    integrating with the silhouette analysis;
    further searching near approximate locations of the armpits; and
    extracting a highest point in neighboring areas with noticeable variations in brightness as the armpits.

10. A method for automated landmark extraction from three-dimensional whole body scanned data, the method comprising:
    using a computer to perform the steps of:
        extracting feature points as landmarks on a human body; and
        directly extracting a seventh cervical point, an inferior angle of scapula, a patella, a lateral malleolus, an elbow, a suprasternale, and a navel based on three-dimensional changes in shape of the human body without premarking landmarks before scanning;
        utilizing human body contour plots for extraction;
        simulating a sense of touch; and
        locating prominent parts of a human body to extract locations of the seventh cervical point the inferior angle of scapula, the patella, the lateral malleolus, and the elbow.

11. The method for automated landmark extraction from three-dimensional whole body scanned data of claim 10, further comprising:
    locating concave parts of the human body to extract the locations of the suprasternale and the navel.

* * * * *